Dec. 18, 1934.    L. J. BUTTOLPH    1,984,457
APPARATUS FOR IRRADIATING CONTAINERS
Filed June 6, 1932
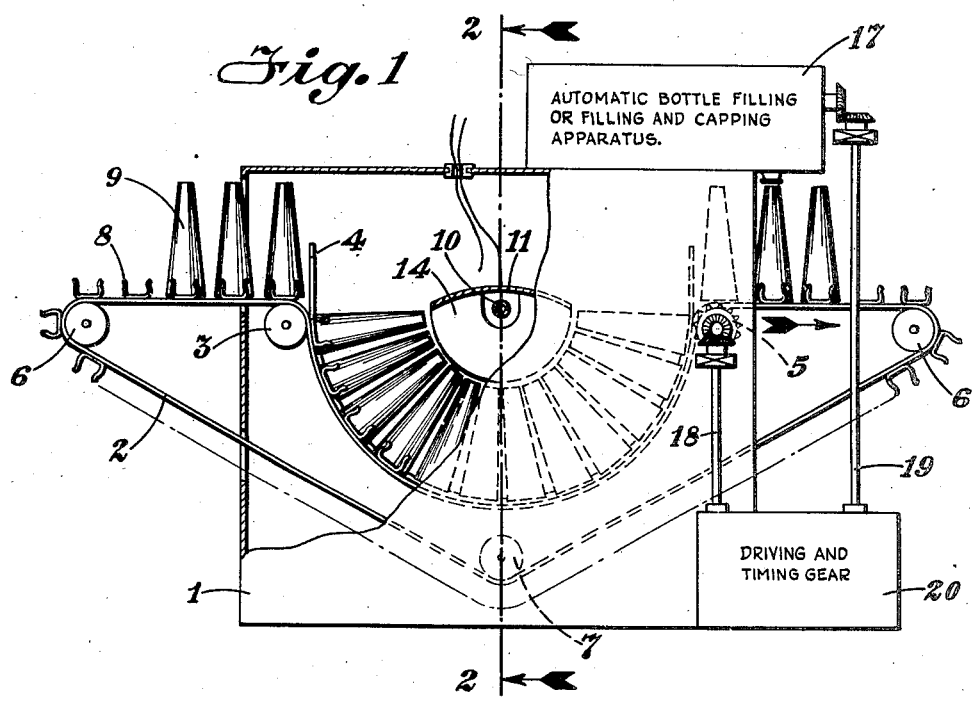
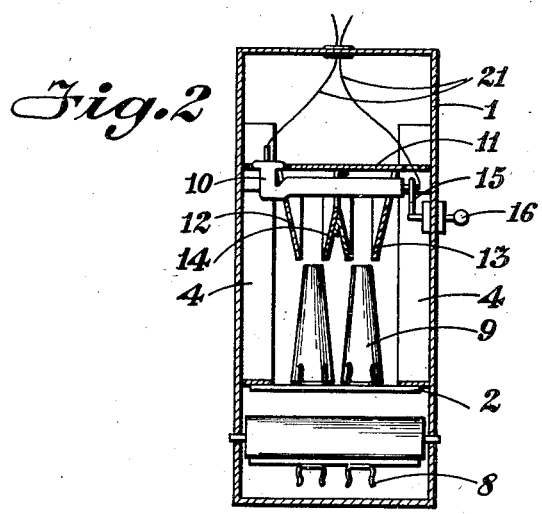
INVENTOR
Leroy J. Buttolph
BY
ATTORNEY Patented Dec. 18, 1934

1,984,457

UNITED STATES PATENT OFFICE 1,984,457

APPARATUS FOR IRRADIATING CONTAINERS

Leroy J. Buttolph, Grantwood, N. J., assignor to General Electric Vapor Lamp Company, Hoboken, N. J., a corporation of New Jersey Application June 6, 1932, Serial No. 615,752

1 Claim. (Cl. 167—3)

The present invention relates to the art of sterilization by ultraviolet irradiation, and in particular to the irradiation of containers to render them sterile.

The present invention consists in the new and novel apparatus, and in the novel method, as hereinafter set forth and claimed.

A particular object of my invention is to provide a novel method of irradiating containers. Another object of my invention is to provide novel apparatus whereby a plurality of containers may be simultaneously irradiated from a relatively concentrated source of ultraviolet. A further object of my invention is to increase the utilization of the radiation from such a source. Still other objects and advantages of my invention will appear from the following detailed specification or from an inspection of the accompanying drawing.

The use of ultraviolet radiations to sterilize containers has long been broached, but has never gone into any extensive use. The principal reason for this has been that no simple method had been devised for completely and efficiently irradiating containers, such as glasses, bottles, cups or the like from a relatively concentrated ultraviolet source, the lack of efficiency in utilization of the ultraviolet radiation being an especially adverse factor. I have now discovered that by means of a new mode of procedure of my invention the entire interior, or other desired portions, of a plurality of containers can be simultaneously irradiated from a single ultraviolet source, with an exceptionally high degree of utilization of the rays available from said source. I have also found that this novel mode of procedure may be easily carried out in a novel apparatus of my invention, this novel apparatus moreover insuring uniform treatment of each container.

For the purpose of illustrating my invention I have shown an apparatus especially designed for the sterilization by irradiation of paper milk bottles in the accompanying drawing, in which Fig. 1 is an elevational view, in part section, of my novel apparatus, and Fig. 2 is a sectional view of the same apparatus, taken on the line 2—2 of Fig. 1.

As shown in the drawing my novel apparatus has a rectangular housing 1 of any suitable material, such as sheet metal. A conveyor belt 2 passes in through one end of said housing, over a support roller 3 and then around a pair of circular guides 4 affixed to the side walls of said housing, thence over another support roller 5 and out of the other end of said housing 1. Another support roller 6 is provided for said conveyor belt some distance outside said housing at each end thereof, said rollers 6 being substantially on the level of the rollers 3 and 5, whereby convenient loading and unloading sections are provided in said conveyor. After passing over one of these rollers 6 said belt passes downwardly into said housing 1 again, around an idler roller 7 below the guides 4, and thence upwardly around the other roller 6 to the point of origin. Said conveyor belt 2 has a plurality of spring clips 8 attached thereto at regular intervals, said clips being adapted to retain the containers 9 as said belt passes around the guides 4. As here shown these containers 9 are paper milk bottles and have the conventional frusto-conical shape. In order to most efficiently utilize the ultraviolet radiation the guides 4 are formed with a radius equal to the height of the cone of which the aforesaid containers are a part, and the bases of said containers 9 are placed close together on the conveyor belt 2, so that as said belt passes around said guides the open mouths of said containers are brought close together. At the center of curvature of said guides 4 there is placed a source of ultraviolet radiations, such as the tubular quartz mercury vapor arc lamp 10 of the well known Cooper Hewitt type, said lamp being preferably positioned with its axis transverse to the belt 2. A shallow reflector 11 is supported by the housing 1 just above the lamp 10, the edges of said reflector extending close to the path of travel of the containers 9 as they move along either end of the path determined by the guides 4. A plane reflector 12 extends downwardly from the reflector 11 at a point near one end of the arc tube of the lamp 10, and substantially closes the semi-circular space between said reflector 12 and the open mouths of the containers 9. A similar reflector 13 is placed at the opposite end of said arc tube, said arc tube being preferably made of such length that each of the reflectors 12 and 13 slope inwardly. Where the belt 2 carries a plurality of rows of containers 9, as shown in Fig. 2, a V-shaped reflector 14 is placed between each row thereof. The reflector 12 is conveniently made to support one end of the lamp 10, while the other reflectors 13 and 14 are preferably slotted to allow vertical movement of said lamp therein. The opposite end of said lamp is supported by a lever 15 which is operatively connected to the handle 16 outside of said housing 1, whereby said lamp 10 may be moved to cause the mercury to connect and disconnect the electrodes therein to start the arc discharge in the usual manner.

The conveyor belt 2 is driven by rotating the roller 5 through any convenient mechanism. In some cases it is desirable to operate this novel sterilizer in synchronism with an automatic bottle filling or filling and capping mechanism 17, which is mounted in juxtaposition to the point where the sterilized containers 9 are brought out of the housing 1. In such cases the belt conveyor 2 has a series of openings (not shown) formed along the edges thereof, and the driving roller 5 is provided with suitable sprockets to engage said openings, in order to prevent slippage on said driving roller. The shaft 18 driving the roller 5 and the shaft 19 driving the filling apparatus 17 are likewise driven from a common source of motive power through a suitable driving and timing gear mechanism 20, in order to provide the desired synchronization of the various operations.

The leads 21 to the lamp 10 are connected to any suitable source of energy through conventional auxiliary apparatus in a well known manner. The electrical circuits and auxiliary apparatus of this lamp form no part of my invention, however, and hence have not been shown or described in detail herein.

In the use and operation of my novel apparatus to sterilize containers 9, such as the paper milk bottles illustrated, the lamp 10 is first started by suitable manipulation of the handle 16. The lamp is then allowed to burn for about 10 minutes to allow the vapor pressure therein to build up to substantially the normal operating pressure, since the full ultraviolet emission is not obtained with lower pressures. The conveyor belt 2 is then started into motion and a container 9 is placed in each clip 8 just before said clip passes into the housing 1. These containers are then carried in a circular path about the lamp 10 with the open mouths of said containers constantly directed toward said lamp in such a manner that the entire interior is constantly irradiated by the direct rays from said lamp. These direct radiations are moreover reinforced by radiations redirected into said containers 9 from the reflectors 11, 12, 13 and 14. Thus the interior of each of these containers is continuously subjected to very intense irradiation. At the same time the efficiency of utilization of the radiations generated by the lamp 10 is extremely high, due both to the large amount of radiation which is used without reflection as a result of the novel positioning of the containers 9 with respect to said lamp, and to the added radiations made available for use in said containers by the various reflectors. After said containers emerge from the opposite end of said housing they are filled, with milk for example, and capped, so that the possibility of contamination between the sterilizing and the closing of the container is virtually nil. The motion of the conveyor belt may, of course, be either continuous or intermittent, according to the requirements of the filling apparatus 17. In either case the belt travel is adjusted to such a rate that complete sterilization of the interior of each container 9 is produced during the period that it is subjected to the radiations from said lamp 10. Where a high intensity quartz mercury vapor arc lamp having an energy consumption in the arc tube of the order of 100 watts per inch is employed at a distance of the order of fifteen inches from the bottom of the containers 9 I find that irradiation for 30 seconds is ample to produce complete sterilization of said containers.

My novel method and apparatus is, of course, especially effective where conical vessels with small mouths are to be irradiated, since the circular movement of the containers about the lamp permits a vast increase in the period during which the interior of said containers can be irradiated from a relatively small light source. It is, however, extremely useful in the irradiation of containers of other shapes, and permits a greater utilization of the radiations from such a light source. Moreover, while I have described my invention as applied to the sterilization of empty containers it is to be understood that it is equally applicable to the sterilization of filled containers, provided the mouths of said containers are closed with a material which is transparent to ultra-violet radiations.

Various other changes, substitutions or omissions, within the scope of the appended claim, may likewise be made, either in the steps of the method or in the apparatus, without departing from the spirit of my invention.

I claim as my invention:

In apparatus for sterilizing containers having a frusto-conical shape, in combination an elongated source of ultra-violet light, means to retain a plurality of said containers, means to support said container retaining means along an arc about said ultraviolet source, said arc having a radius substantially equal to the height of the cone of which said containers are a segment, whereby the interiors of a plurality of said containers can be irradiated simultaneously from said source, and a pair of converging reflectors extending from separated points on said source toward the adjacent ends of containers supported along said arc.

LEROY J. BUTTOLPH.